UNITED STATES PATENT OFFICE.

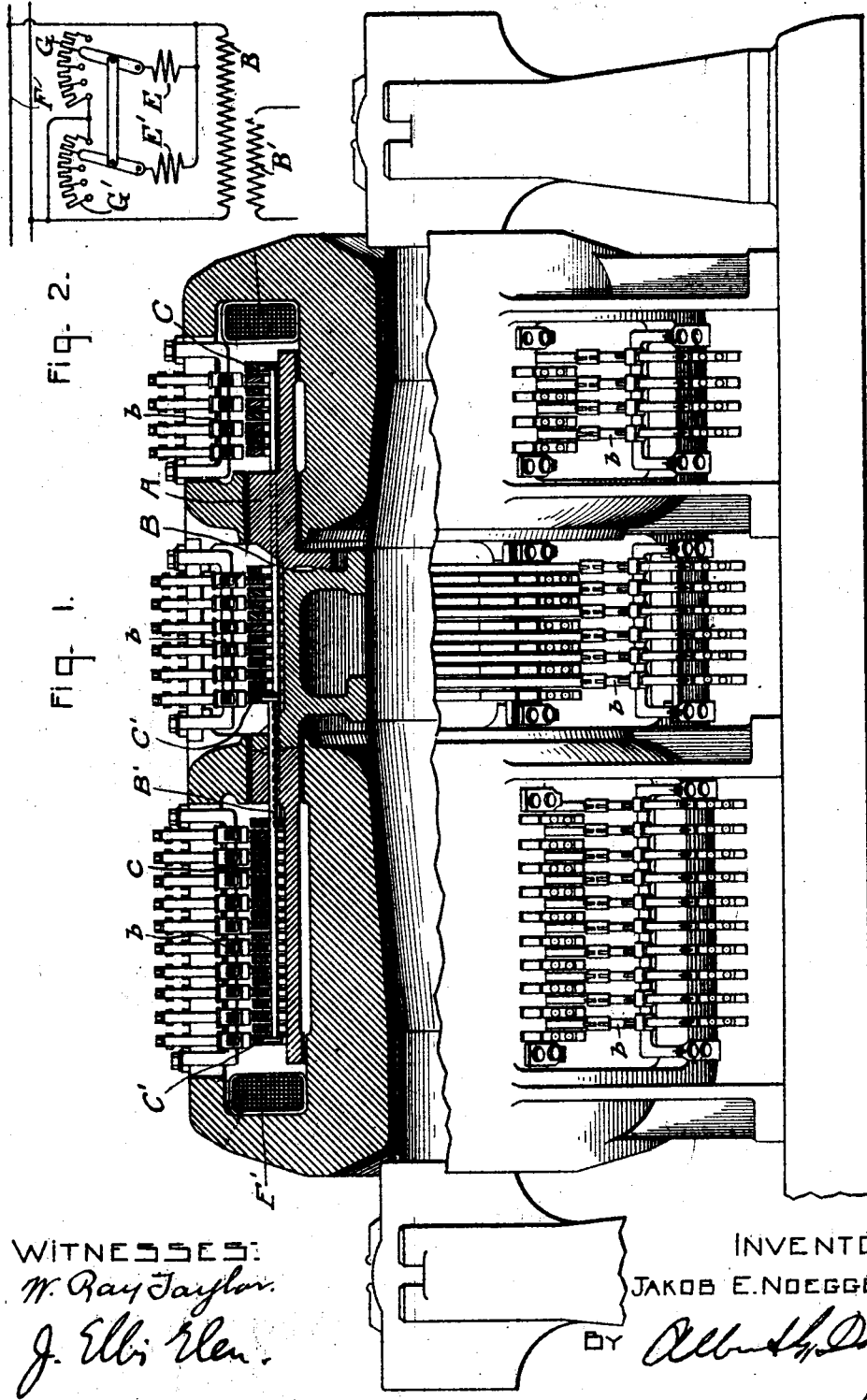

JAKOB E. NOEGGERATH, OF SCHENECTADY, NEW YORK, ASSIGNOR TO GENERAL ELECTRIC COMPANY, A CORPORATION OF NEW YORK.

DYNAMO-ELECTRIC MACHINE.

960,383.

Specification of Letters Patent. Patented June 7, 1910.

Application filed April 26, 1909. Serial No. 492,170.

*To all whom it may concern:*

Be it known that I, JAKOB E. NOEGGERATH, a citizen of the United States, residing at Schenectady, county of Schenectady, State of New York, have invented certain new and useful Improvements in Dynamo-Electric Machines, of which the following is a specification.

My invention relates to dynamo-electric machines of the unipolar type, and its object is to provide a machine which may be used as a variable-voltage rotary transformer to transform a current from one voltage to another and relatively variable voltage, or, if driven by mechanical power as a generator, to supply currents of different and relatively variable voltages to a plurality of load circuits.

The features of novelty in my invention will be specifically pointed out in the appended claims, but my invention will best be understood by reference to the accompanying drawings, in which—

Figure 1 shows a side elevation, partly in cross-section, of a unipolar machine arranged in accordance with my invention, and Fig. 2 is a diagram of connections.

In Fig. 1, A represents the armature of the machine which carries two sets of conductors, B and $B^1$, which are displaced from each other axially but which overlap. The collector rings, C C, are provided for conductors B B, and collector rings C $C^1$ for conductor $B^1$.

b b represents brushes bearing on the collector rings.

The field magnet consists of two unipolar fields magnetized by the concentric field coils E and $E^1$. The flux produced by the field coil E passes through that portion of the armature between collector rings C and $C^1$ on which the conductors B alone are carried, while the flux of field coil $E^1$ passes through the portion of the armature carrying both sets of conductors B and $B^1$; that is, the portion of the armature where these two sets of conductors overlap. The flux that is effective for producing a voltage in the conductors B is, consequently, the sum of the fluxes produced by the two field coils, while the flux of coil $E^1$ alone is effective in producing coltage in the conductors $B^1$. Therefore, by varying the relative strengths of the currents in the two coils, the relative voltages produced in the two sets of armature conductors may be varied.

In Fig. 2 I have indicated suitable connections for the armature conductors and field coils. The conductors B may be employed as a motor winding connected to the supply circuit F and the conductors $B^1$ as generator windings connected to a load circuit. The field coils E and $E^1$ may be connected in shunt to the supply circuit and provided with suitable rheostats for varying the relative strengths of the currents in the two coils. I have indicated two rheostats, G and $G^1$, in series with the field coils E and $E^1$, respectively, and shown the rheostat arms connected together so that as the current in one field coil is increased that in the other is decreased. By this arrangement a constant induced voltage may be maintained in the motor conductors B, so that the speed of the machine will remain constant while the voltage on the generator winding and load circuit is varied.

What I claim as new and desire to secure by Letters Patent of the United States, is:—

1. A dynamo-electric machine comprising an armature, a plurality of sets of armature conductors carried thereby and axially displaced from, but overlapping, each other, sets of collector rings to which the ends of said conductors are connected, brushes engaging said rings, a field magnet forming a plurality of axially displaced unipolar fields, one surrounding the armature where the sets of conductors overlap so that its flux is cut by both sets and another surrounding a portion of the armature over which only one set of conductors extends, and separate field coils for magnetizing said unipolar fields, whereby the relative induced voltages in said sets of conductors may be varied by varying the currents in said separate field coils.

2. A dynamo-electric machine comprising an armature, a plurality of sets of armature conductors carried thereby and axially displaced from, but overlapping, each other, sets of collector rings to which the ends of said conductors are connected, brushes engaging said rings, a field magnet forming a plurality of axially displaced unipolar fields, one surrounding the armature where the sets of conductors overlap so that its flux is cut by both sets and another surrounding a portion of the armature over which only one set of conductors extends, separate field coils for magnetizing said unipolar fields, whereby the relative induced voltages in said sets of conductors may be varied by varying the currents in said separate field coils, connections for supplying current to one of said sets of armature conductors, and connections for leading current from another of said sets.

3. A dynamo-electric machine comprising an armature, three axially displaced sets of collector rings carried thereby, a set of conductors extending from rings of one outside set to rings of the other outside set, a second set of conductors extending from other rings of one outside set to rings of the central set, a field magnet forming two unipolar fields surrounding the armature on opposite sides of the central set of rings, and separate field coils for magnetizing the two fields, whereby the relative voltages induced in the two sets of armature conductors may be varied by varying the currents in said separate field coils.

In witness whereof, I have hereunto set my hand this 24th day of April, 1909.

JAKOB E. NOEGGERATH.

Witnesses:
  BENJAMIN B. HULL,
  HELEN ORFORD.